United States Patent
Joung

(10) Patent No.: US 11,742,972 B2
(45) Date of Patent: Aug. 29, 2023

(54) METHOD OF GUARANTEEING JITTER UPPER BOUND FOR A NETWORK WITHOUT TIME-SYNCHRONIZATION

(71) Applicant: Sangmyung University Industry-Academy Cooperation Foundation, Seoul (KR)

(72) Inventor: Jinoo Joung, Seoul (KR)

(73) Assignee: Sangmyung University Industry-Academy Cooperation Foundation, Seoul (KR)

( * ) Notice: Subject to any disclaimer, the term of this patent is extended or adjusted under 35 U.S.C. 154(b) by 88 days.

(21) Appl. No.: 17/236,168

(22) Filed: Apr. 21, 2021

(65) Prior Publication Data

US 2022/0247504 A1    Aug. 4, 2022

(30) Foreign Application Priority Data

Feb. 4, 2021 (KR) ........................ 10-2021-0016065

(51) Int. Cl.
*H04J 3/06* (2006.01)

(52) U.S. Cl.
CPC ................................ *H04J 3/0661* (2013.01)

(58) Field of Classification Search
USPC ....................................................... 370/516
See application file for complete search history.

(56) References Cited

U.S. PATENT DOCUMENTS

| | | | | |
|---|---|---|---|---|
| 2002/0163932 A1* | 11/2002 | Fischer | ................. | H04L 1/1883 370/465 |
| 2006/0045020 A1* | 3/2006 | Picco | ...................... | H04L 47/10 370/503 |
| 2010/0235486 A1* | 9/2010 | White | ................... | H04N 21/233 709/248 |
| 2014/0269372 A1* | 9/2014 | Roy | ..................... | H04L 43/0858 370/252 |
| 2018/0196771 A1* | 7/2018 | Tannenbaum | ......... | G06F 13/366 |

FOREIGN PATENT DOCUMENTS

| | | |
|---|---|---|
| JP | 2000-92130 | 3/2000 |
| KR | 10-2188746 | 12/2020 |

* cited by examiner

*Primary Examiner* — Gregory B Sefcheck
*Assistant Examiner* — Majid Esmaeilian

(57) ABSTRACT

In a method of guaranteeing a jitter upper bound for a network without time-synchronization, which guarantees a jitter upper bound for a flow that is transmitted from a source to a destination through a network, the network guarantees a latency upper bound of the flow, a buffer located between the network and the destination holds a packet of the flow for a predetermined buffer holding interval and then outputs, and the jitter upper bound is set to an arbitrary value including 0 (zero).

6 Claims, 3 Drawing Sheets

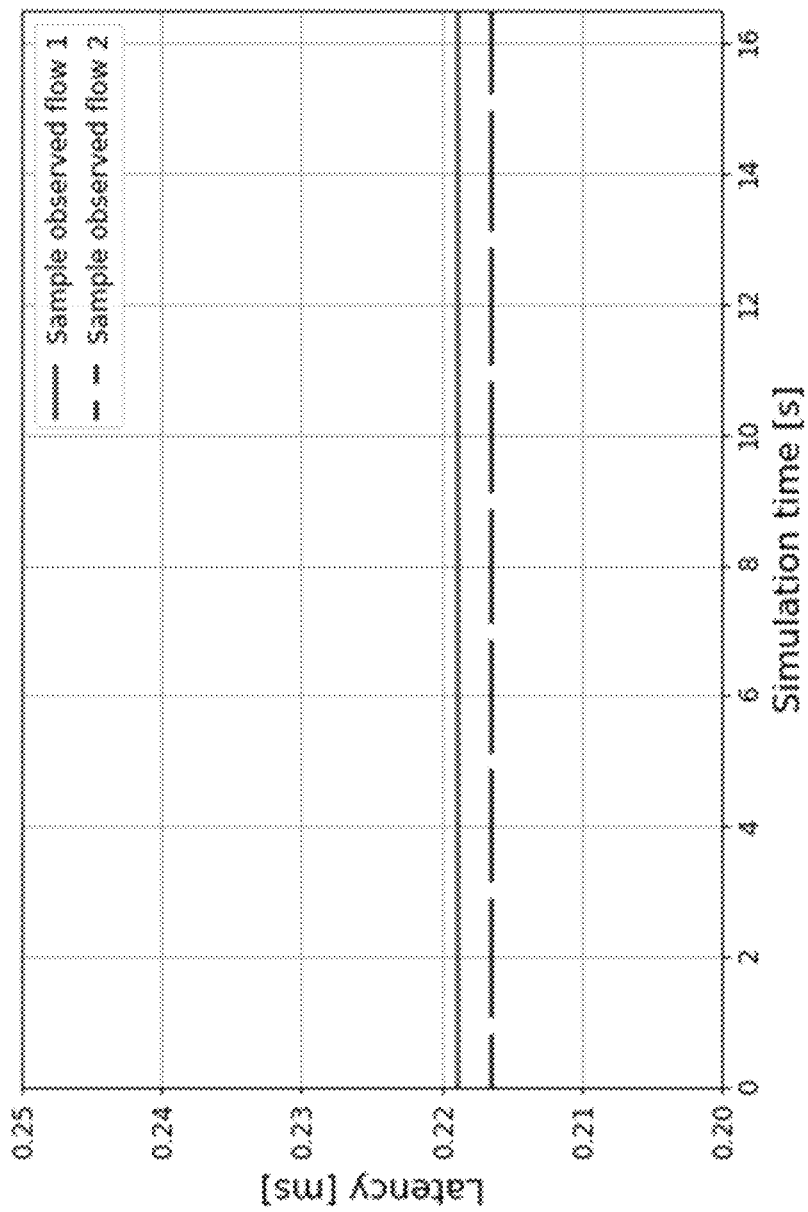

METHOD OF GUARANTEEING JITTER UPPER BOUND FOR A NETWORK WITHOUT TIME-SYNCHRONIZATION

CROSS-REFERENCE TO RELATED APPLICATION

This application claims priority of Korean Patent Application No. 10-2021-0016065, filed on Feb. 4, 2021, in the KIPO (Korean Intellectual Property Office), the disclosure of which is incorporated herein entirely by reference.

BACKGROUND OF THE INVENTION

Field of the Invention

The present invention relates to a method of guaranteeing a jitter upper bound for a network without time-synchronization, and more particularly, to a method of guaranteeing any jitter upper bound including zero jitter without time-synchronization between nodes included in a network.

Description of the Related Art

The demands for deterministic network services are getting significant, and in particular, the demands are strong in closed small networks such as in-car networks or smart factory networks, in which the latency and jitter requirements are clearly defined.

Typical control cycles in automated factories are 100 to 1000 ms with a jitter less than 1 ms, while in robotics, the control cycles may be less than 1 ms with a jitter less than 1 μs. The On-Board Software Reference Architecture Network Communication Specification (OSRA-NET), the European standard for satellite network, defines seven communication classes and their jitter upper bounds as well as the latency upper bounds as shown in Table 1 below. A class 6 flow in OSRA-NET, for example, requires maximum latency of 10 ms and maximum jitter of 2 ms, while having more than 100 Mbps data rate.

TABLE 1

| Class | Frequency (Hz) | Data rate (bps) | Max Jitter (ms) | Max Latency (ms) |
|---|---|---|---|---|
| 1 | 0.1-1 | 100-10K | 10 | 10 |
| 2-a | 8-10 | <1M | 5-10 | 10 |
| 2-b | 8-10 | <1M | 5-10 | 10 |
| 3 | 8-10 | <250K | 10 | 10 |
| 4 | 0.1-1 | >100M | <100 | <100 |
| 5-a | 10-1K | <3M | 0.5-1 | 0.5 |
| 5-b | 10-1K | <3M | 0.5-1 | 0.5 |
| 6 | 1-10 | >100M | 2 | 10 |
| 7 | 1-10 | 100-1K | 1 | 2 |

Common public radio interface (CPRI) in 5G network is another example of small networks with stringent latency and jitter requirements. CPRI is a packet-based constant-bit-rate protocol developed to transport data between the remote radio heads (RRHs) and baseband units (BBUs) pool, and the CPRI network is usually a simple single-hop network. While achieving the throughput of 10 Gbps as required in the fronthaul networks, CPRI is expected to maintain the maximum end-to-end latencies less than 100 to 250 μs, jitter within 65 to 100 ns and BER (bit error rate) less than $10^{-12}$, otherwise performance of the networks degrades significantly.

Meanwhile, there are also emerging applications that require latency and jitter upper bound in larger scale networks. Machine-to-machine communication for cloudified industrial and robotic automation involves moderate-to-large scale networks. This type of communications requires very fine-grained timing accuracy for the dispersion of control commands and for the collection of telemetry data over a wide area. ITU-T SG-13 has defined such services to support critical grade reliability and extremely low as well as highly precise latency. This is because some industrial controllers require very precise synchronization and spacing of telemetry streams and control data.

The problem of guaranteeing the jitter upper bound in arbitrary sized networks with any type of topology, with random dynamic input traffic may be considered. The jitter is defined to be the latency difference of two packets within a flow, not a difference from a clock signal or from an average latency, as it is clearly summarized in RFC 3393.

In large scale networks, the end-nodes join/leave frequently, and the flows are dynamically generated and terminated. Achieving satisfactory deterministic performance in such an environment would be challenging.

TSN task group has standardized multiple components for jitter-sensitive services. Among them, the 802.1 Qbv time sensitive queues (also known as Time Aware Shaper, TAS) and 802.1 Qch cyclic queuing and forwarding (CQF) are built for jitter minimization as well as latency guarantee.

TAS defines the "gate" to each queue. The gates are either open or closed on a time slot. Multiple gates may open simultaneously. In such a case, the strict priority scheduling applies to the open queues. A central network controller (CNC) determines which gates and when to open. CQF function coordinates the slot openings in cascading nodes, such that flows traversing the nodes experience the minimum latency. Based on these functions, TSN supports a model for deterministic packet services. These functions collectively are celled the TSN synchronous approach. The TSN synchronous approach requires three major efforts; 1) the time synchronization along the nodes in the network, 2) the slot scheduling and coordination by a central control device, and 3) feasibility test for flow admission control. These requirements significantly impact the scalability of a network.

The slot scheduling is a time and resource consuming task, and as the number of flows increases, a greater burden is placed on these limited resources. Also, for dynamic environments, runtime reconfigurations are necessary and scheduling becomes harder. In addition, time synchronization also causes too much overhead, and there is a limit in synchronization accuracy.

With all the efforts until now, however, there is no system that can guarantee a jitter upper bound, including zero jitter, in general networks with arbitrary traffic. For a limited topology, such as a single-hop CPRI network, there has been research into achieving zero jitter with packet-level slot scheduling methods in lightly utilized environments. This work shows that even for the smallest networks with lightly loaded traffic, it is necessary to micro-manage the slots with the size of a single packet transmission, and to reorder slots dynamically, in order for achieving zero jitter.

Therefore, in the art, there is a need for a method of guaranteeing a jitter upper bound even in a large-scale or dynamic network.

SUMMARY OF THE INVENTION

In order to solve the above problems, an embodiment of the present disclosure provides a method of guaranteeing a jitter upper bound for a deterministic network without time-synchronization.

In the method of guaranteeing a jitter upper bound for a deterministic network without time-synchronization, which guarantees a jitter upper bound for a flow that is transmitted from a source to a destination through a network, the network guarantees a latency upper bound of the flow, a buffer located between the network and the destination holds a packet of the flow for a predetermined buffer holding interval and then outputs, and the jitter upper bound is set to an arbitrary value including 0 (zero).

In addition, the solution to the above problem does not list all features of the present disclosure. Various features of the present disclosure and advantages and effects thereof may be understood in more detail with reference to the following specific embodiments.

According to an embodiment of the present disclosure, it is possible to guarantee a desired jitter upper bound, even zero jitter.

That is, it is possible to guarantee a desired jitter upper bound without tremendous effort of the prior art for time-synchronization, slot allocation and coordination between nodes. Accordingly, the jitter upper bound may be guaranteed for dynamic networks of medium or larger sizes.

BRIEF DESCRIPTION OF THE DRAWINGS

The above and other features and advantages will become more apparent to those of ordinary skill in the art by describing in detail exemplary embodiments with reference to the attached drawings, in which:

FIG. 5 is a diagram showing end-to-end buffering latency of all packets in two arbitrary sample C&C flow observed during the simulation.

In the following description, the same or similar elements are labeled with the same or similar reference numbers.

DETAILED DESCRIPTION

Figure 1:
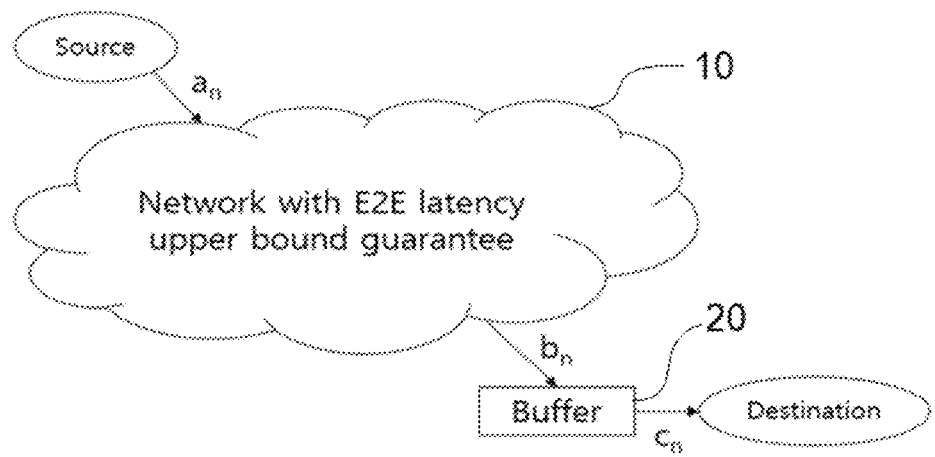
FIG. 1 is a diagram showing the overall architecture of a framework for a method of guaranteeing a jitter upper bound for a network without time-synchronization according to an embodiment of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

The core idea of the present disclosure is to buffer a first packet of a flow for an appropriate time interval based on a latency upper bound provided by a network, and to buffer all subsequent packets of the flow so that inter-arrival intervals thereof become similar to inter-departure intervals.

In the prior art, time-stamp is generally used for latency/jitter measurement or clock synchronization, but in the present disclosure, it is used as a tool for jitter upper bound guarantee.

Hereinafter, a method of guaranteeing a jitter upper bound for a deterministic network without time-synchronization according to an embodiment of the present disclosure will be described.

FIG. 1 is a diagram showing the overall architecture of a framework for a method of guaranteeing a jitter upper bound for a network without time-synchronization according to an embodiment of the present disclosure.

In the present disclosure, time-synchronization or slot allocation task between nodes included in the network is not required, and the following three components are required:
1) a network 10 that guarantees latency upper bounds;
2) a buffer 20 before a destination, which can hold the packets destined for the destination for a predetermined interval; and
3) packets with relative time-stamps inscribed with the clock of the source, or of the network ingress interface.

The relative time-stamp means that it is not needed to synchronize the source of the traffic recording a time-stamp with another node. In the present disclosure, there is a mechanism for time-stamping a departure instance from the source or an arrival instance ($a_n$) to the network to the packet. For example, the time-stamp function of TCP or RTP may be used. Alternatively, a time-stamp implemented in a lower layer, for example a MAC layer, may also be used. In addition, there is no need to share a synchronized clock between the source and the destination, and it is sufficient to know the difference between time-stamps, namely information about the relative arrival instance.

Also, the destination may be a small-sized network with a synchronized network, like a TSN synchronous network.

The network 10 is irrelevant to any size, topology or input pattern as long as it guarantees the latency upper bound (U) of the flow. In addition, the network 10 provides a lower latency bound (W) to the flow, and the lower latency bound (W) may be caused by, for example, a transmission and propagation delay within the network.

The time when an $n^{th}$ packet of the flow is input to the network 10 is called an arrival instance ($a_n$). The time when the $n^{th}$ packet is output from the network 10 is called a departure instance ($b_n$). For example, $a_1$ and $b_1$ are arrival and departure instances of the first packet of the flow, respectively. It is assumed that the buffering parameter m is a value between W and U, that is, $W \le m \le U$.

The buffer 20 may hold packets of the flow according to predefined intervals. To determine the buffer holding interval, a time-stamp in each packet may be used as described later.

It may be assumed that the buffer 20 is able to support as many as the number of flows destined for the destination. In addition, if the buffer 20 is not suitable to be placed within an end station, a buffering function may be added at the boundary of the network 10.

FIG. 1 shows only a single flow between a source and a destination, where the arrival instance ($a_n$), the departure instance ($b_n$) and the buffer-out instance ($c_n$) of the $n^{th}$ packet of the flow are depicted. Here, end-to-end latency and end-to-end buffering latency may be defined as ($b_n - a_n$) and ($c_n - a_n$), respectively.

The basic rule for determining the buffer holding interval is as follows.

The buffer 20 holds the first packet for an interval (m–W), for m, $W \le m \le U$. The buffer-out instance of the first packet $c_1$ is ($b_{1+m-W}$).

The buffer 20 holds the $n^{th}$ packet until instance max $\{b_n, c_1+(a_n-a_1)\}$, for n>1.

To this end, the buffer 20 needs information on W, U, $b_1$, $c_1$, $b_n$ and ($a_n-a_1$). Here, W and U can be informed by the network, and $b_1$ and $b_n$ can be easily obtained from the buffer with its own clock. The buffer 20 needs to keep the record of the buffer-out instance $c_1$. The time difference ($a_n-a_1$) can be calculated from the difference of the time-stamps of the packet written at the source. As such, the buffer 20 does not need to know the exact values of $a_n$ or $a_1$, so the source clock does not need to be synchronized with the buffer clock.

Algorithm 1 below is an algorithm for determining a buffer holding interval according to an embodiment of the present disclosure.

---

Algorithm 1 Buffer holding interval decision

01: procedure BUFFER (m, PKT)
  ▷ m is a preset value based on W, U, and the jitter bound
     ▷ W ≤ m ≤ U
  ▷ PKT is a packet just received by the buffer
02: if first packet in the flow then
03:   hold the packet with the interval (m – W)
  ▷ The buffer-out instance of the first packet $c_1$ is then ($b_1$ + m – W)
04: TRANSMIT the packet at the decided instance

---

Algorithm 1 Buffer holding interval decision

05: while there is a packet already arrived before the first packet
06:   hold the packet until the instance max $\{b_n, c_1 + (a_n - a_1)\}$
     ▷ Let's say this is $n^{th}$ packet, n > 1
07: TRANSMIT the packet at the decided instance
08: end while
09: else if the first packet has already arrived then
10:   hold $n_{th}$ packet until the instance max $\{b_n, c_1 + (a_n - a_1)\}$
     ▷ Let's say this is $n^{th}$ packet, n > 1
11: TRANSMIT the packet at the decided instance
12: else wait for another packet arrival
13: end if

---

The implementation of the lines 6 and 10 in Algorithm 1 is feasible since max $\{b_n, c_1+(a_n-a_1)\}$ is greater than or equal to $b_n$, which is the packet departure instance of the $n^{th}$ packet from the network, by definition.

The buffer 20 has to be able to identify the first packet of a flow, in order to identify the relative time-stamp values representing the instance $b_1$ and $a_1$. If a flag at the header indicating that the packet is indeed the first packet is used, or if a FIFO property is guaranteed in the network, this is trivial. Alternatively, a sequence number written in the packet header, such as the one in RTP, would work as well.

If some of the earlier packets (e.g., $2^{nd}$ or $3^{rd}$ packets of a flow) arrive to the buffer sooner than the first packet, they will be held until the first packet's buffer-out plus the additional interval, as specified in lines 5 and 6 of Algorithm 1.

Figure 2:
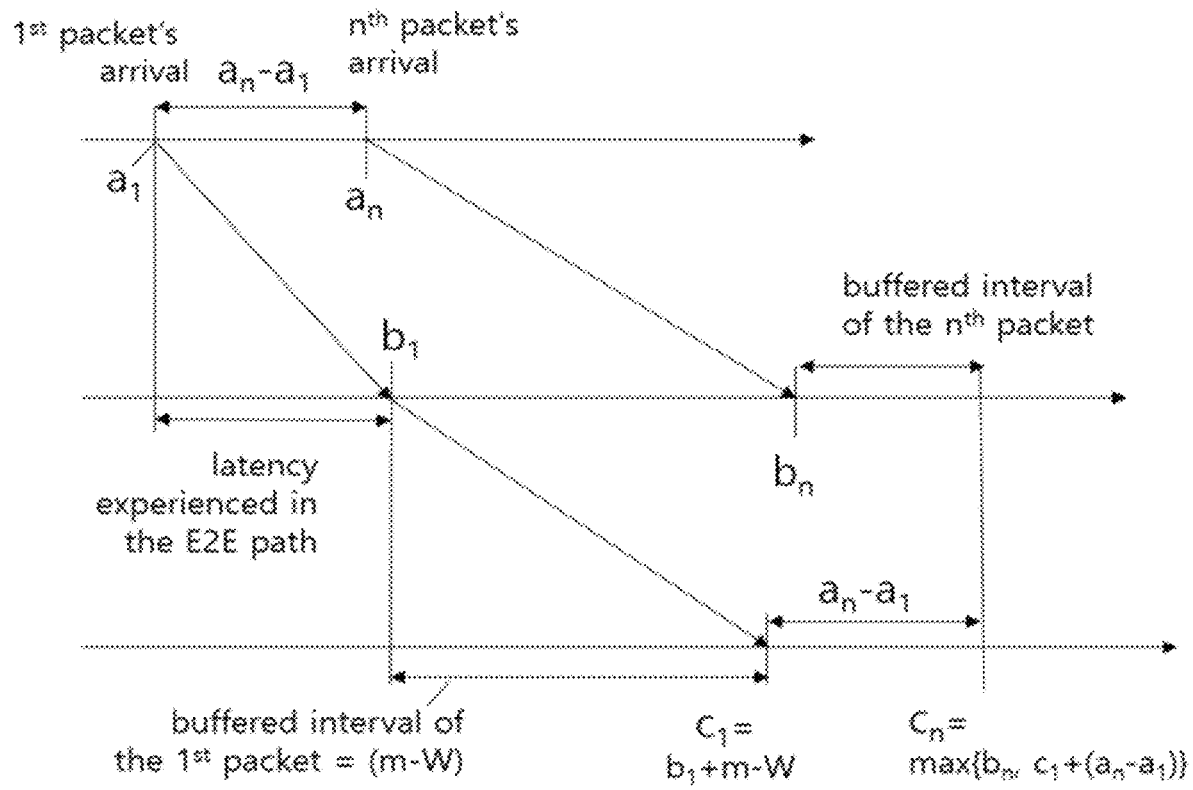
FIG. 2 is a diagram showing the relationship between arrival, departure and buffer-out instances of packet of a flow under observation.

FIG. 2 is a diagram showing the relationship between arrival, departure and buffer-out instances of packet of a flow under observation.

According to the present disclosure described above, it may be found that the following theorems hold.

Theorem 1 (Upper Bound of the End to End (E2E) Buffered Latency)

The latency from the packet arrival to the buffer-out instance ($c_n - a_n$) is upper bound by (m+U–W):
Proof. By definition, $$c_n - a_n = \max\{b_n, c_1 + (a_n - a_1)\} - a_n$$
$$= \max\{b_n - a_n, b_1 + m - W - a_1\}$$
$$= \max\{b_n - a_n, m - W + (b_1 - a_1)\}$$
$$\le \max\{U, m - W + U\} = m - W + U,$$

since $b_n - a_n \le U$ for any n, and $m \ge W$.

Theorem 2 (Lower Bound of the E2E Buffered Latency)

The latency from the packet arrival to the buffer-out instance ($c_n - a_n$) is lower bound by m:
Proof. By definition, $$c_n - a_n = \max\{b_n, c_1 + (a_n - a_1)\} - a_n$$
$$= \max\{b_n - a_n, m - W + (b_1 - a_1)\}$$
$$\ge \max\{W, m - W + W\} = m,$$

since $b_n - a_n \ge W$ for any n, and $m \ge W$.

The jitter, or the latency difference between a pair of packets, can be defined as follows.

Definition (Jitter)

The jitter between the $i^{th}$ packet and the $j^{th}$ packet of a flow is defined as follows:

$$r_{ij}=|(c_i-a_i)-(c_j-a_j)|.$$

Theorem 3 (Upper Bound of the Jitter)

The jitter is upper bounded by (U−m):
Proof. Define $r_n=r_{n1}=(c_n-a_n)-(c_1-a_1)$.
$c_1=(b_1+m-W)$ and $c_n=\max\{b_n, c_1+(a_n-a_1)\}$. From the definition, $$\begin{aligned}
r_n &= (c_n-c_1)-(a_n-a_1) \\
&= \max\{b_n-c_1, a_n-a_1\}-(a_n-a_1) \\
&= \max\{b_n-c_1-(a_n-a_1), 0\} \\
&= \max\{b_n-b_1-m+W-(a_n-a_1), 0\} \\
&= \max\{(b_n-a_n)-m+W-(b_1-a_1), 0\} \\
&\leq \max\{U-m+W-W, 0\} = U-m, \text{ since } U \geq m.
\end{aligned}$$

The jitter between packets i and j, $r_{ij}$ can be rewritten such as $r_{ij}=|(c_i-c_1)-(a_i-a_1)-(c_j-c_1)+(a_j-a_1)|=|r_i-r_j|$. Since $0 \leq r_i \leq U-m$ and $0 \leq r_j \leq U-m$, the jitter $r_{ij} \leq U-m$, for any i, j>0.

For example, if it is assumed that there is a flow requesting the end-to-end buffered latency upper bound of 10 ms and a jitter upper bound of 1 ms, from Theorem 1, (m+U−W)=10 ms, and from Theorem 3, (U−m)=1 ms. Based on these equations, it is possible to obtain U=5.5 ms+W/2 and m=4.5 ms+W/2. As such, during the call setup process, upon the flow's requested specifications, the network and the buffer may assign U=(5.5 ms+W/2) of the actual network latency upper bound, and m=(4.5 ms+W/2) parameter for the buffering.

As an extreme case, if it is wanted to achieve an absolute synchronization, i.e., the inter-departure times of the output packets $(c_n-c_{n-1})$ are exactly the same as the inter-arrival times $(a_n-a_{n-1})$. Then, the jitter may be set to be equal to 0 (zero). In this case, the absolute synchronization may be achieved by setting m=U, the buffered latency upper bound becomes 2U−W, which is close to 2U when W is negligible.

Figure 3:
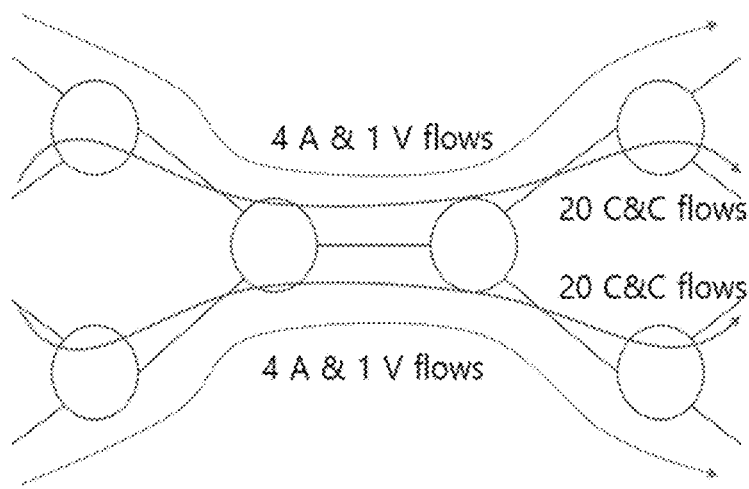
FIG. 3 is a diagram showing an example of a network for performance verification of the present disclosure.

Hereinafter, a simple network with a small number of time-sensitive flows will be considered to check the performance of the present disclosure. FIG. 3 is a diagram showing an example of a network for performance verification of the present disclosure.

The traffic is composed of three classes with characteristics summarized in Table 2.

TABLE 2

| Symbol | Traffic type | {Packet length, Maximum burst size, Arrival rate} of a flow |
| --- | --- | --- |
| A | Audio | {2 Kbit, 2 Kbit, 1.6 Mbps} |
| V | Video | {12 Kbit, 360 Kbit, 11 Mbps} |
| C | Command & Control | {2.4 Kbit, 2.4 Kbit, 480 Kbps} |

The video flow emits a larger burst compared to the other types of flows, and the number of C&C flows are more than double the number of the other two types of flows combined.

The flows characteristics are further simplified such that the audio flows (A flows) emit 256 byte packet every 1.25 ms, video flows (V flows) emit 30*1500 byte bursts with 33 ms period, and C&C flows (C flows) emit 300 byte packet every 5 ms. As shown in FIG. 3, four A flows and one V flow share the route, so do 20 C&C flows.

Link capacities for all the links are set to be 1 Gbps, which is common with Gigabit Ethernet nowadays. With the notation for a flow {Packet length, Max burst, Arrival rate}, audio flow's parameter set is {256 B, 256 B, 256 B/1.25 ms} to {2 Kbit, 2 K, 1.6 Mbps}, video flows' parameter set is {1500 B, 30*1500 B, 30*1500 B/33 ms} to {12 Kbit, 360 Kbit, 11 Mbps}, and C&C flows' parameter set is {300 B, 300 B, 300 B/5 ms} to {2400 bit, 2400, 480 Kbps}.

Given the topology, the input flows and their destination, three types of solutions that guarantee latency upper bound are considered. They are the TSN synchronous approach, the DiffServ, and the FAIR framework. The three types of traffic are assumed to have the same high priority.

Considering the problems to be solved by the present disclosure, the FAIR or DiffServ framework, which guarantees the latency upper bound, may be selected.

The FAIR may guarantee 0.2164 ms latency upper bound. Therefore, the parameter U equals 0.2164 ms. The sum of the packet transmission time in four nodes is 4 times of 2.4 μs, which is the latency lower bound, and the parameter W equals to 9.6 μs. If the parameter m is set to be equal to U, 0.2164 ms, then from Theorem 1, the end-to-end buffered latency upper bound is (m+U−W), which is equal to 0.4304 ms and the jitter upper bound is U−m. That is, a perfect synchronization can be achieved without time-synchronization functions specified in the TSN standard, and simultaneously the latency upper bound requirements (10 ms in this case) can be satisfied by a wide margin, which is a much better result compared to TSN.

CPRI is expected to maintain the maximum end-to-end latencies less than 100 to 250 μs, jitter within 65 to 100 ns, in 10 G Ethernet network. If scaling down to a 1 G network, it is possible to infer about 1 to 2.5 ms latency upper bound and 0.65 to 1 μs jitter upper bound.

If the jitter upper bound is set to be 1 μs, then again from Theorems 1 and 3, with the FAIR framework, m=U−1 μs=0.2154 ms, m+U−W=0.4294, U−m=1 μs. As such, the latency upper bound 0.4294 ms meets even the stringent CPRI requirement of 1 ms.

The DiffServ framework, or simple strict priority schedulers for high priority traffic with preemption, can guarantee 0.8584 ms. It is also possible to achieve zero jitter with the DiffServ framework, with a buffer, at the cost of lengthening the end-to-end buffered latency upper bound roughly twice, to 1.7144 ms. This is the similar upper bound to that of the TSN synchronous approach, which is 1.712 ms. With 1 μs jitter upper bound, the buffered latency upper bound is 1.7134 ms.

Hereinafter, the result of simulating the network of FIG. 3 will be described. The input traffic and the routes also follow the description in FIG. 3, and the flows' characteristics follow Table 2. The simulation environment is constructed using OMNeT++. It is a C++ based network simulation framework, which is known to be good for constructing discrete event network simulation.

In the simulation, all the flows emit the maximum burst at the start of the simulation. It is so set in order to observe the worst case behavior at the earlier stage of the simulation. A single run of the simulation lasts for 16.5 seconds. The C&C flows, the audio flows, and the video flows produce 3,300, 13,200, and 15,000 packets respectively, for a single run, and 100 runs are performed repeatedly. All C&C flows with the same input port and output port were observed, and the result was obtained using the latency observed for 6,600,000 packets.

Figure 4:
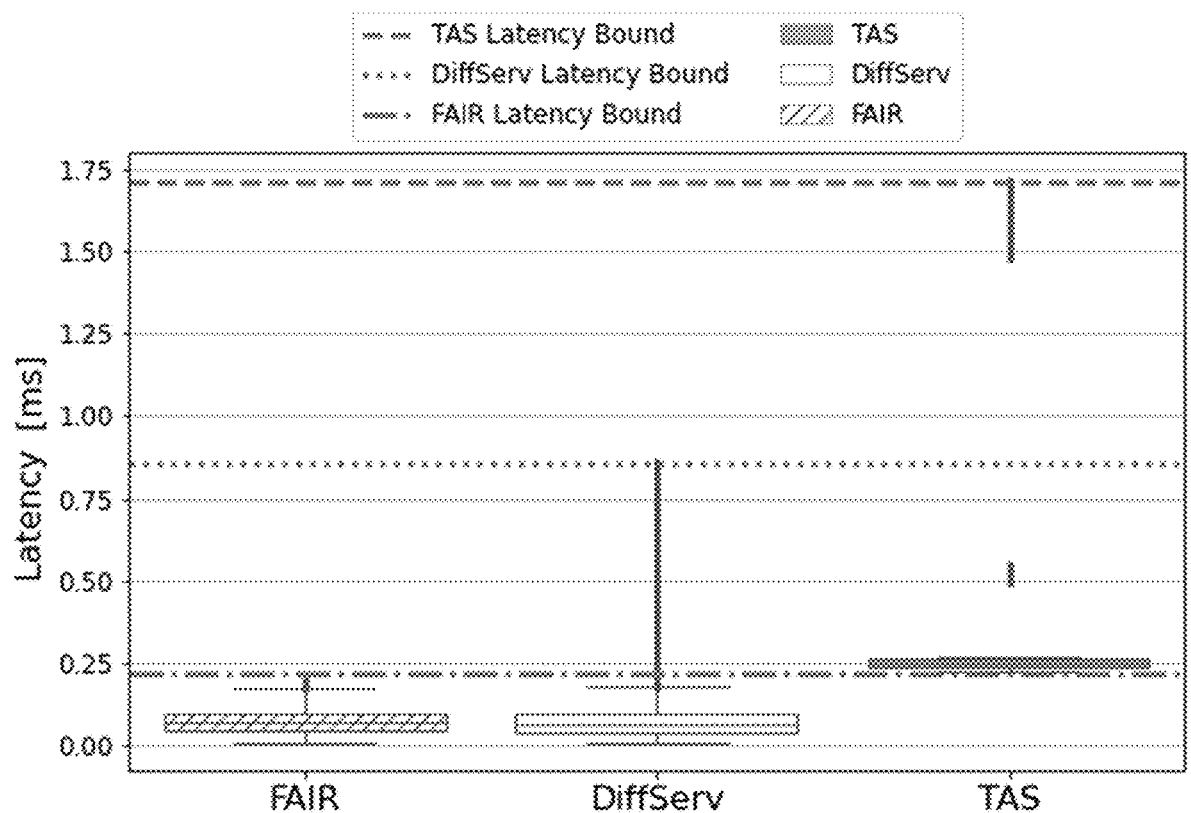
FIG. 4 is a diagram showing a latency distribution obtained from flow simulation of the C&C using end-to-end latency upper bound and three different frameworks.

FIG. 4 is a diagram showing a latency distribution obtained from flow simulation of the C&C using end-to-end latency upper bound and three different frameworks.

Referring to FIG. 4, the theoretical latency upper bound in all frameworks matches the maximum observed latencies. In the TAS framework, the worst latency is observed when the slots of the three types of flow overlap. In addition, the middle dot that looks like a short line in the TAS indicates the packet of the slot that partially overlaps the slot of the video flow.

FIG. 5 is a diagram showing end-to-end buffering latency of all packets in two arbitrary sample C&C flows observed during the simulation.

Referring to FIG. 5, the latency of a subsequent packet is determined according to the actual latency experienced by the first packet of the flow. The fixed latency of the sample flow is located near the end-to-end latency upper bound of 0.2164 ms. It was confirmed that the flow achieved zero latency.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method of guaranteeing a jitter upper bound for a network without time-synchronization, which guarantees a jitter upper bound for a flow that is transmitted from a source to a destination through a network,
   setting a jitter upper bound to an arbitrary value,
   determining buffer holding intervals,
   holding, at a buffer located between the network and the destination, packets of the flow for the predetermined holding intervals,
   the buffer outputting the packet of the flow, and
   wherein the network guarantees a latency upper bound of the flow,
   wherein the arbitrary value can be as low as 0 (zero),
   wherein the packet includes a relative time-stamp in which a departure time from the source or an arrival time to the network is recorded,
   wherein the buffer holding interval is determined using the relative time-stamp, and
   wherein the buffer is configured to:
      hold a first packet of the flow for a buffer holding interval (m−W); and
      hold a $n^{th}$ packet of the flow until a time max $\{b_n, C_1+(a_n-a_1)\}$,
      where $a_n$ is an arrival time when the $n^{th}$ packet of the flow arrives at the network, $a_1$ is an arrival time when the first packet of the flow arrives at the network, $b_n$ is a departure time when the $n^{th}$ packet departs from the network, $c_1$ is a buffer-out time when the first packet departs from the buffer, U is the latency upper bound, W is a latency lower bound provided by the network, m is a buffering parameter, W≤m≤U, and n >1.

2. The method of guaranteeing a jitter upper bound for a network without time-synchronization of claim 1, wherein the jitter upper bound is U−m, and zero jitter is implemented by setting m=U.

3. The method of guaranteeing a jitter upper bound for a network without time-synchronization of claim 2, wherein the arbitrary value is set to 0 (zero).

4. A method of guaranteeing a jitter upper bound for a network without time-synchronization, which guarantees a jitter upper bound for a flow that is transmitted from a source to a destination through a network,
   setting a jitter upper bound to an arbitrary value,
   determining buffer holding intervals,
   holding, at a buffer located at a boundary of the network, packets of the flow for the predetermined holding intervals,
   the buffer outputting the packet of the flow, and
   wherein the network guarantees a latency upper bound of the flow,
   wherein the arbitrary value can be as low as 0 (zero),
   wherein the packet includes a relative time-stamp in which a departure time from the source or an arrival time to the network is recorded,
   wherein the buffer holding interval is determined using the relative time-stamp, and
   wherein the buffer is configured to:
      hold a first packet of the flow for a buffer holding interval (m−W); and
      hold a $n^{th}$ packet of the flow until a time max $\{b_n, C_1+(a_n-a_1)\}$,
      where $a_n$ is an arrival time when the $n^{th}$ packet of the flow arrives at the network, $a_1$ is an arrival time when the first packet of the flow arrives at the network, $b_n$ is a departure time when the $n^{th}$ packet departs from the network, $c_1$ is a buffer-out time when the first packet departs from the buffer, U is the latency upper bound, W is a latency lower bound provided by the network, m is a buffering parameter, W≤m≤U, and n>1.

5. The method of guaranteeing a jitter upper bound for a network without time-synchronization of claim 4, wherein the jitter upper bound is U−m, and zero jitter is implemented by setting m=U.

6. The method of guaranteeing a jitter upper bound for a network without time-synchronization of claim 5, wherein the arbitrary value is set to 0 (zero).

* * * * *